United States Patent [19]

Balyasny et al.

[11] Patent Number: 4,530,452
[45] Date of Patent: Jul. 23, 1985

[54] APPARATUS FOR CLEAVING AN OPTICAL FIBER

[75] Inventors: Marik Balyasny, Van Nuys; William F. Lovell, Los Angeles, both of Calif.

[73] Assignee: Automation Industries, Inc., Greenwich, Conn.

[21] Appl. No.: 645,295

[22] Filed: Aug. 29, 1984

Related U.S. Application Data

[63] Continuation of Ser. No. 370,039, Apr. 20, 1982, abandoned.

[51] Int. Cl.³ .............................................. C03B 37/16
[52] U.S. Cl. .......................................... 225/96; 225/2; 225/96.5; 225/101; 225/106; 83/564; 83/925 R; 30/140; 30/164.9
[58] Field of Search ............... 30/140, 164.9; 65/10.2; 83/564, 586, 925 R; 225/2, 96, 96.5, 101, 103, 105, 106

[56] References Cited

U.S. PATENT DOCUMENTS

| | | | |
|---|---|---|---|
| 4,168,026 | 11/1979 | Lukas et al. | 225/96.5 |
| 4,216,004 | 8/1980 | Brehm et al. | 225/96.5 X |
| 4,229,876 | 10/1980 | Doty | 225/96.5 X |
| 4,249,305 | 2/1981 | Basile | 30/164.9 |
| 4,257,546 | 3/1981 | Benasutti | 225/96.5 |
| 4,262,417 | 4/1981 | Logan et al. | 30/140 X |
| 4,315,368 | 2/1982 | Basile | 30/164.9 X |

FOREIGN PATENT DOCUMENTS 2046242 11/1980 United Kingdom ................. 225/96

OTHER PUBLICATIONS

Khoe et al, Optical Fiber End Preparation, Applied Optics, vol. 20, No. 4, pp. 707-714, Feb. 15, 1981.

Primary Examiner—Paul A. Bell
Assistant Examiner—Taylor J. Ross
Attorney, Agent, or Firm—Thomas L. Flattery

[57] ABSTRACT

A hand-held optical fiber cleaving tool has a shaft for receiving a fiber which has had the end portion of the protective cover removed. A reduced diameter section in the shaft acts as an abutment, and the exposed end of the fiber is held in a V-block clamp. The clamp is spring-biased to place the fiber in tension during a circumferential scoring by a pointed scoring tool which is journaled about the shaft. The applied tension causes the fiber to break upon completion of the scoring. In an alternate embodiment which is not hand-held, support is provided for the fiber opposite the scoring tool.

5 Claims, 12 Drawing Figures

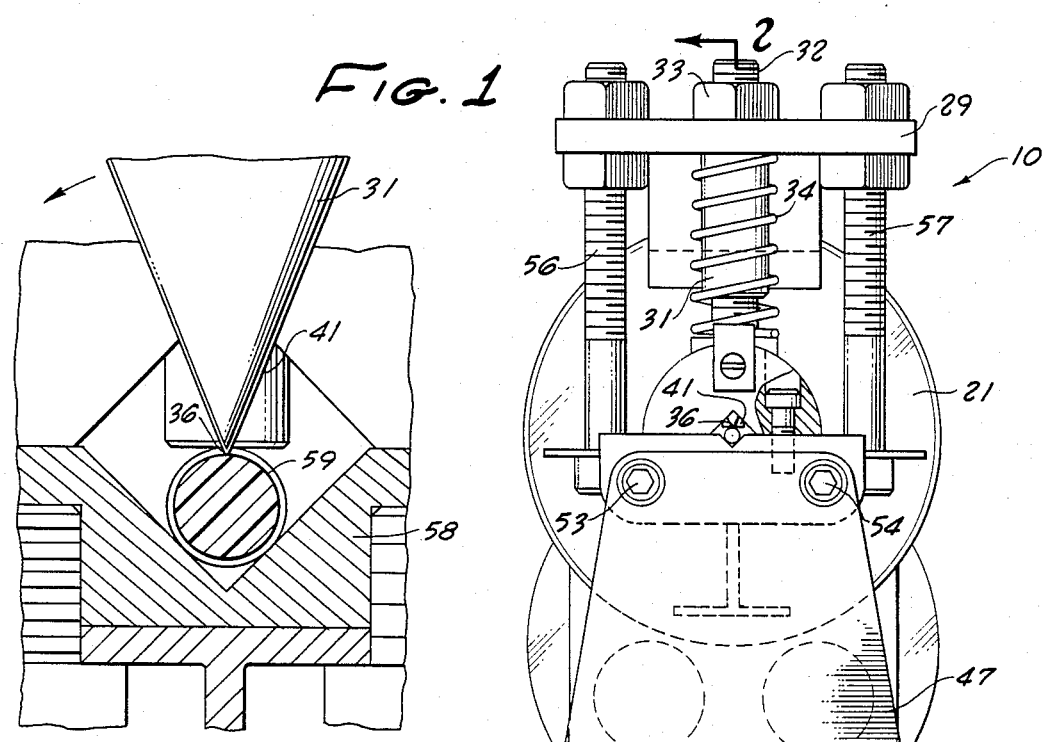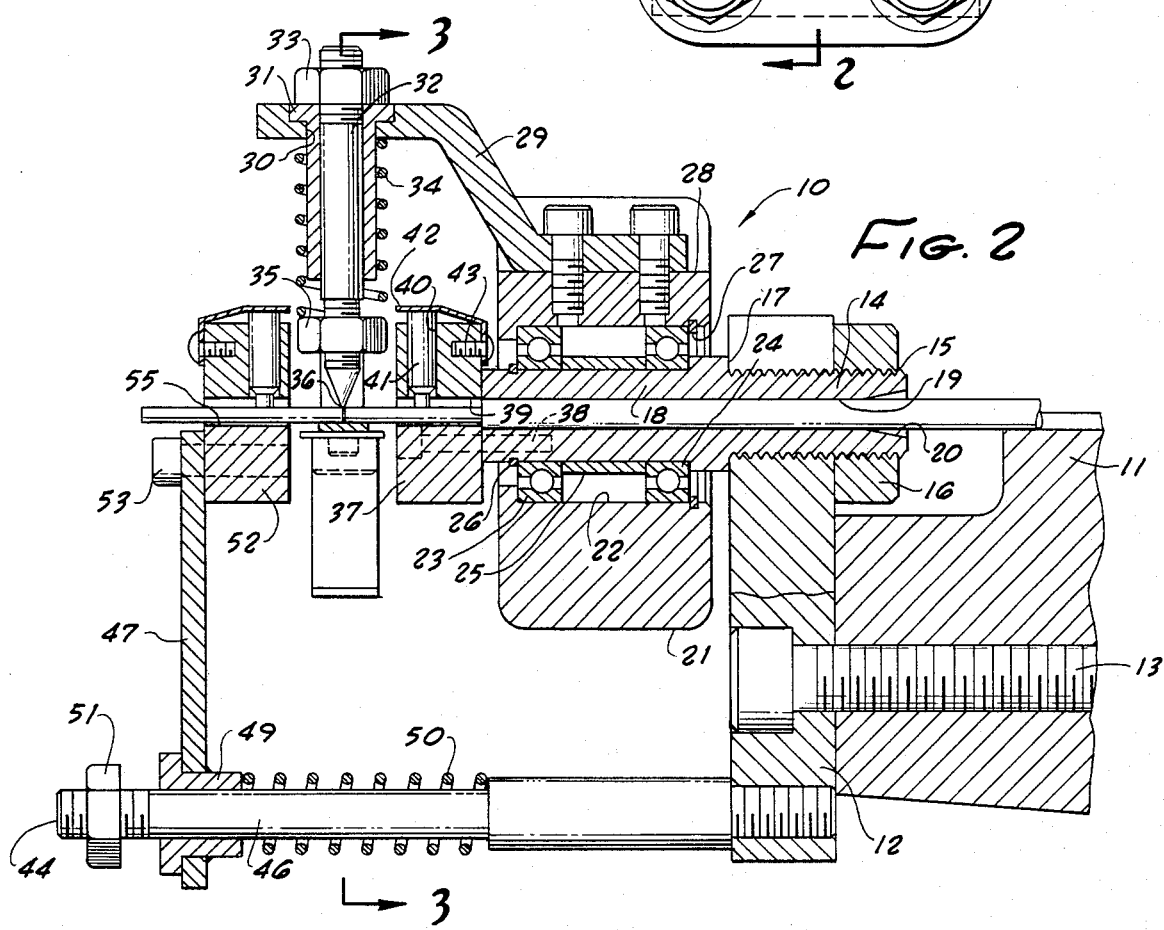

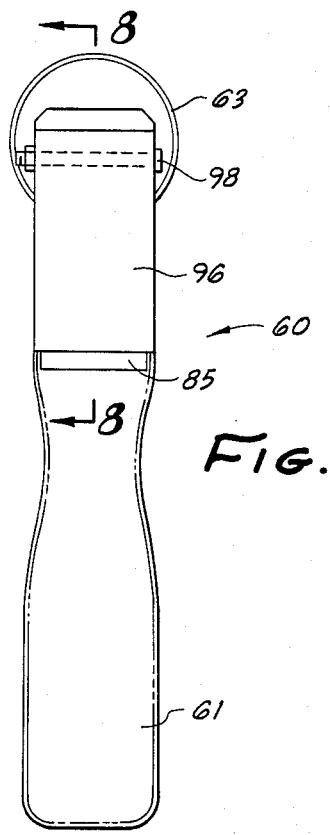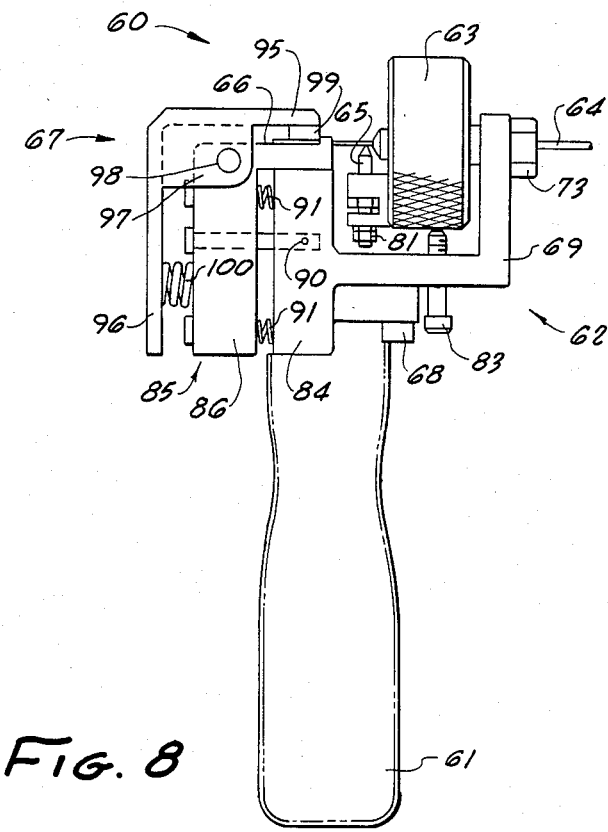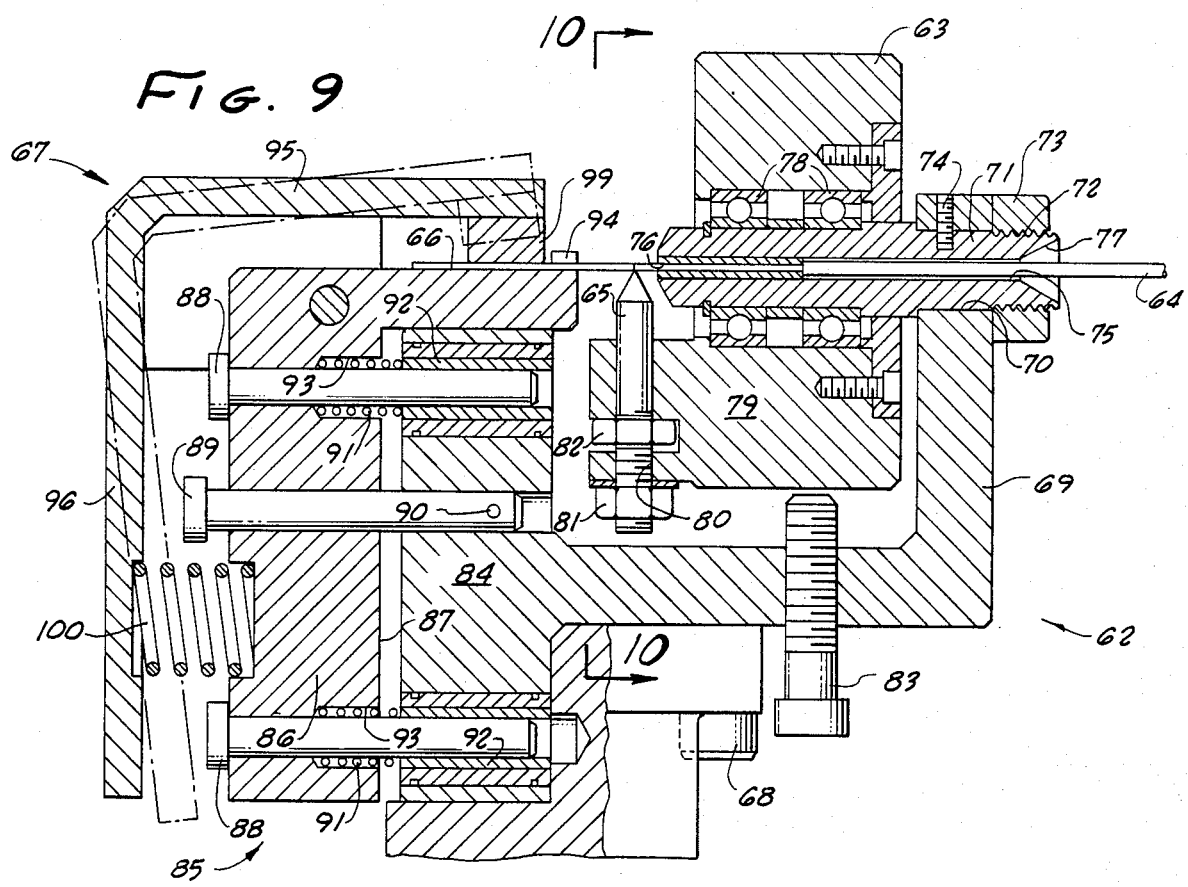

APPARATUS FOR CLEAVING AN OPTICAL FIBER

This is a continuation of application Ser. No. 370,039, filed Apr. 20, 1982, now abandoned.

The present invention relates generally to apparatus for cleaving an optical fiber and, more particularly, to such an apparatus which accomplishes the cleaving or cutting of the fiber unaccompanied by appreciable bending or twisting of the fiber and thereby producing a fiber end surface that is precisely faced-off at 90 degrees to the fiber longitudinal axis.

BACKGROUND OF THE INVENTION

Optical fibers measuring in the thousandths of an inch in cross-section in diameter and constructed of plastic or glass are utilized in many ways for the transmission of an optical signal over extensive distances. It is a fundamentally important requirement for the highly efficient receipt of an optical signal by the fiber and the continued transmission of the optical signal to processing equipment that the end faces of the fiber be faced off very precisely at 90 degrees to the fiber axis. For example, where it is necessary to splice or interconnect the ends of two fibers, if their respective end faces are skewed to even a few degrees this will result in a substantial loss in transmission of the optical signal across the junction. In addition, a fully satisfactory cut or cleavage of the fiber should leave the end face flat for the same reason.

According to one known technique of cleaving a fiber, the fiber is scored on its peripheral surface about the entire circumference in a plane perpendicular to the fiber longitudinal axis. After scoring, the fiber is then pulled manually by the operator along its longitudinal direction until the fiber separates at the scored line. Achievement of perpendicularity of a fiber end face to the longitudinal end face by this technique is not fully satisfactory for present-day low-loss requirements and can vary up to as much as 3 degrees from the perpendicular. Also, separating the fiber pieces at the score line by the operator pulling on the fiber can produce damage to the fiber cleaved surface by dragging the cutter across the surface. Still further, there is the distinct possibility of inducing twist into the fiber which can result in a distortion of the newly-cut optical fiber end.

SUMMARY OF THE INVENTION

An optical fiber typically includes a plastic or glass core surrounded by a plastic or glass cladding and a protective buffer cover. Prior to cleaving such a fiber with apparatus to be described, an end portion of the protective buffer cover is removed from the fiber leaving what will be referred to as a "bare" fiber end portion although it consists of the core with cladding. In accordance with a first embodiment of the invention, the bare fiber is secured within a pair of spaced-apart V-shaped support blocks. Spring loaded plungers bear down lightly upon the upper surface of the bare fiber holding the fiber securely within the V supports. A further V-shaped support is located between the first two mentioned V-blocks and is interconnected in a unitary manner with a holder of a pointed scoring tool located at the opposite side of the further V-block. The entire assembly of this further V-block and the scoring tool are mounted for rotation about the fiber extending between the first two recited V-blocks in a plane 90 degrees to the longitudinal axis of the fiber.

The rotatable V-block is normally positioned so that it will secure the fiber in the same longitudinal line as the first two recited V-blocks and a spring loaded means urges the scoring tool towards the fiber such that on rotation it will move completely about the full circumference of the fiber and score it in a plane which is precisely 90 degrees to the fiber longitudinal axis.

At the same time that the scoring operation is taking place, a tensioning means urges the two V-blocks holding the bare fiber away from each other thereby placing the fiber being scored in tension. On completion of scoring, the tension induced in the fiber is sufficient to cause it to separate at the line of score.

In accordance with an alternate version of the invention, the fiber scoring apparatus is especially adapted for hand-held operation. A rotor has an axial opening through which the bare fiber end portion extends. The hand-held mounting to which the rotor is secured also includes a flat support lying in the same plane as the rotor axial opening and spaced from the rotor. A finger operated means raises a jaw away from the support allowing the bare fiber extending across the space intervening the rotor and flat support to come to rest on the support. Actuation of the means also moves the support against a compression spring in a direction toward the rotor. Release of the finger operated means simultaneously effects engagement of the bare fiber between the jaw and support, and causes the bare fiber to be placed in tension by the compression spring.

As in the first described embodiment, a sharp pointed scribing or scoring tool is mounted onto the rotor and extends into the space between the rotor and support for scoring the bare fiber throughout a full 360 degrees.

DESCRIPTION OF THE DRAWING

FIG. 1 is an end elevational view of a first form of cleaving apparatus of this invention as viewed into the end of the fiber.

FIG. 2 is a side elevational, sectional view taken along the line 2—2 of FIG. 1.

FIG. 5 is an end elevational, sectional view taken along the line 5—5 of FIG. 4.

FIGS. 7 and 8 are end and side elevational views of an alternate embodiment.

FIG. 9 is a side elevational, sectional view of the cleaving apparatus of FIG. 8.

DESCRIPTION OF PREFERRED EMBODIMENTS

Figure 3:
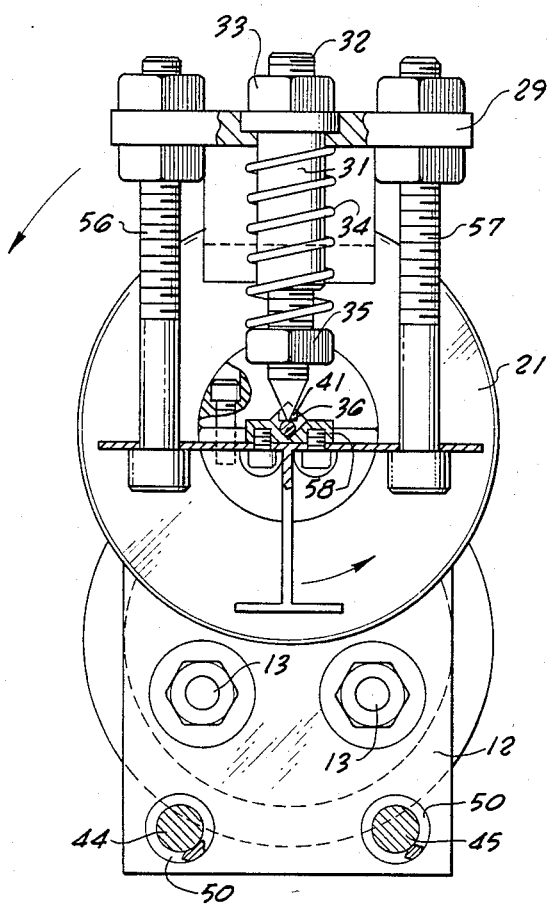
FIG. 3 is an end elevational, sectional view taken along the line 3—3 of FIG. 2.

Turning now to the drawing, and particularly FIGS. 1 and 2, the optical fiber cleaving apparatus of the invention is identified generally as at 10 and is shown as mounted onto the side surface of and extending horizontally from a wall 11. Unitary relation is given to the apparatus by a generally vertically arranged support plate 12 which is shown affixed to the wall 11 by one or more suitable threaded means 13. Cylindrical shaft or axle 14 includes a threaded end portion 15 which is received within a similarly threaded opening in the plate 12 to extend outwardly beyond the plate and secured thereto by a nut 16. An enlarged shoulder 17 separates the threaded portion of the shaft from a turned-down, smooth cylindrical end portion 18, the latter extending at substantially 90 degrees from the outer surface of the support plate 12. A bore 19 is formed in the axle 14 along the longitudinal axis thereof and includes an enlarged conical end opening 20 for a purpose to be described. A generally cylindrical rotor 21 has an enlarged axial opening 22 received over the shaft smooth end portion 18 and is rotatably related to the shaft by first and second ball-bearing races 23 and 24, respectively. More particularly, the ball-bearing races are spaced along the opening 22 and maintained fixedly spaced by a ferrule 25 and C-clips 26 and 27 at the outer extremities.

A portion of the circumferential periphery of the rotor 21 is removed as at 28 to receive the end portion of a bracket 29 that extends outwardly of the rotor 21. An opening 30 in the bracket receives a collet 31 through which a closely fitting rod 32 with threaded end portions passes. The outer end of rod 32 is secured to the bracket by a nut 33. A coil spring 34 fitted onto the collet 31 exerts a resilient force against a further nut 35 received on the inner end of the rod 32. In this way, the lower pointed end 36 of the rod 32 as depicted in FIG. 2 is resiliently urged away from the bracket 29 to intercept the extended axis of bore 19. Adjustment of nut 33 spatially positions the rod pointed end 36 from the bracket, while adjustment of nut 35 controls the spring force exerted on the rod.

A first fiber support block 37 is affixed to the outer end of axle 14 by a threaded member 38. An opening 39 in the block communicates with the bore 19 and includes a V-shaped lower wall for a use to be described. A transverse opening 40 in the support block extends from the outside periphery to opening 39 at a point opposite the V-shaped wall. A plunger 41 is slidably located in opening 40 and is resiliently urged inwardly by a leaf spring 42 affixed to the periphery of support block 37 by threaded member 43.

First and second rods 44 and 45 each have a threaded end received within similarly threaded openings in the plate 12 spaced substantially below the rotor (FIG. 1). The outer end portion is turned down as at 46 and has its outer end threaded. A support arm 47, is slidably received on the rod portion 46 via a collet 49. A coil spring 50 urges the support arm 47 resiliently away from wall 12 and a nut 51 retains the arm on the rod.

The support arm 47 has its upper end secured to a second fiber support block 52 by machine screws 53 and 54, respectively. Support block 52 is identical in construction to support block 37, and has its V-shaped opening 55 aligned with the opening 39.

Turning now particularly to FIGS. 1 and 5, the bracket 29 is seen to be substantially wider than the rod 32 and collet 31 and includes first and second bolts 56 and 57 extending downwardly therefrom, one at each side of the scorer rod 32. A support block 58, preferably having a V-shaped slot in its upper surface, is secured at a fixed spacing from the bracket 29 by bolts 56 and 57. More particularly, the V-shaped slot in support block 58 is adjusted to be closely aligned with the V-shaped openings in blocks 37 and 52. It is important to note that the bracket 29, scorer rod and support block 58 rotate as a unit with the rotor 21.

In use of the described apparatus, a fiber to be cleaved or cut first has the protective covering removed from an end portion leaving a length of glass or plastic fiber and cladding. The so-stripped fiber end is inserted into enlarged opening 20 and pushed along the bore 19 until it exits from the axle bore into support block 37. The plunger 41 is lifted and the fiber moved past the scorer point 26. On lifting the plunger of block 52 the outer end of the bare fiber is enabled to lie outwardly of the last recited plunger.

It is advisable when moving the bare fiber past the scorer rod 32 to lift the rod by hand. Otherwise, contact of the point 36 with the fiber as it moves therepast may damage the fiber or induce an undesirable twist in it.

Next, the plunger in block 52 is raised once more and the arm 47 is moved toward the wall 12 placing the spring 50 in compression after which the plunger is released. The fiber is now held in tension between the two plungers.

Figure 4:
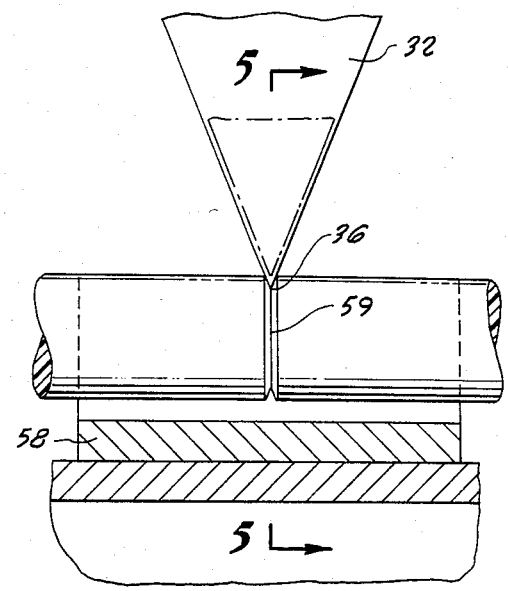
FIG. 4 is a side elevation, partially fragmentary, enlarged view of the scoring tool shown producing a scored line on a fiber.
Figure 6:
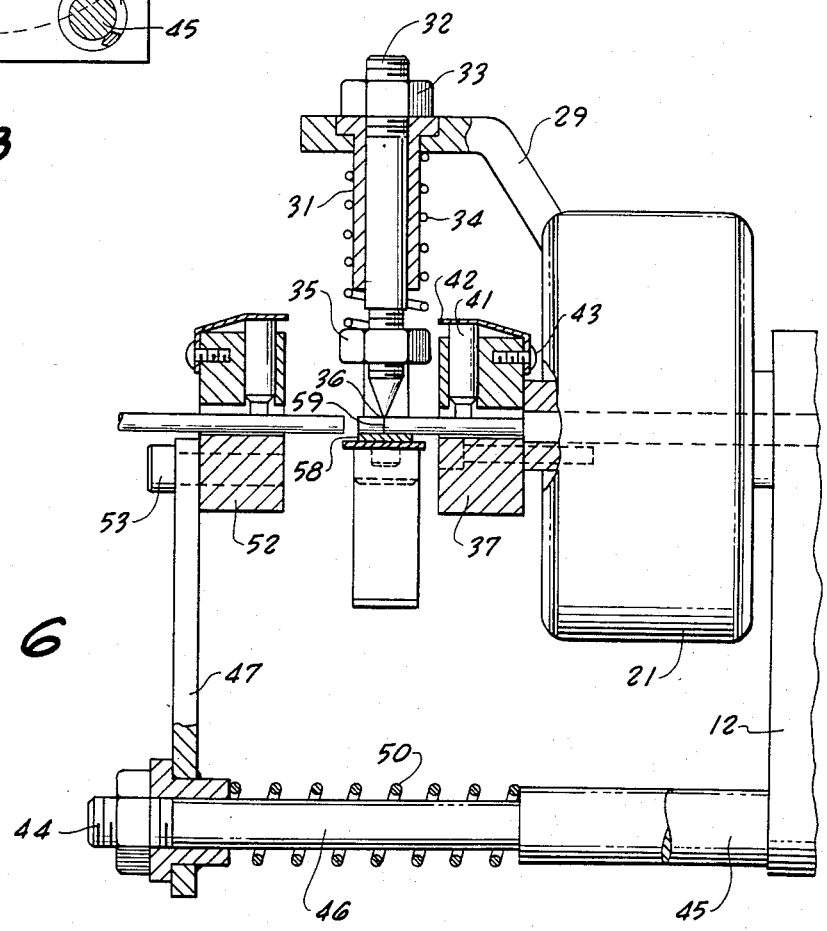
FIG. 6 is a side elevational view similar to FIG. 2 showing the apparatus of the invention immediately after cleavage of a fiber.

Finally, the rod 32 is carefully released so as to press the pointed end 36 against the bare fiber. The bracket 29 is then rotated completely about the fiber which causes a scored line 59 to be formed in the fiber surface which is very precisely at 90 degrees to the fiber longitudinal axis (FIG. 4).

For the ensuing description of an alternate form of the invention, reference is now made to FIGS. 7 and 8 where optical fiber cleaving apparatus is identified generally as at 60. More particularly, the apparatus includes a handle 61 on an outer end of which there is affixed a generally U-shaped yoke or mounting means 62. One leg of the mounting means 62 has a rotor 63 rotatably mounted thereto and which rotor includes an axial opening for receiving a fiber 64 to be cleaved. A scriber or scoring means 65 moves with the rotor and is located just outwardly of the rotor in the space between the two yoke arms. Carried by the other arm of the yoke 62 is a relatively flat support surface 66 with a clamping means 67 that can be operated by the hand of the operator to selectively engage the outer end of the fiber 64.

In a way that will be more particularly described, spring means are incorporated within the apparatus for placing the fiber in tension at the same time that the fiber is gripped by the means 67. Similar to the operation of the first embodiment, after the fiber is suitably retained within the apparatus, the rotor 63 is rotated 360 degrees whereby the scriber or scoring means 65 produces a score line completely about the fiber and, upon this being achieved, the tension induced in the fiber causes the fiber to cleave along the scoring line.

For the detailed description that follows of the scoring apparatus of this second embodiment, reference is made particularly to FIG. 9. The support means 62 is generally U-shaped giving the appearance of a yoke with the cross bar being affixed to the upper end of handle 61 by one or more threaded members 68. One upstanding arm 69 of the yoke forms a wall member substantially parallel to the handle 61, and includes and opening 70 within which a shaft 71 is fittingly received at substantially 90 degrees to the arm. The outer end of shaft 71 is threaded as at 72 for receiving a nut 73 to secure the shaft firmly to arm 69. A pin 74 secures the shaft against rotation while the nut 74 is tightened. The shaft also includes an axial opening passing therethrough having a first diameter 75 that is substantially larger than optical fiber complete with its protective outer coating, and a second smaller diameter opening collinear with the first diameter opening 76 for fittingly receiving a bare optical fiber (i.e., with protective buffer coating removed). The entrance end of the shaft opening via which the fiber is inserted has an enlarged tapered mouth 77 for aiding and guiding the fiber.

The rotor 63 is of generally disclike construction and rotatably journaled onto the axle 71 via a pair of ball bearing races 78. A portion of the rotor 63 extends outwardly from the inwardly directed major face to form a bifurcated member 79 through which a common opening 80 is formed at 90 degrees to the openings 75 and 76 in the shaft. The scriber or scoring means 65 is a rodlike member having one end formed into a suitable point and which is inserted through the opening 80. The opposite end of the scriber is threaded for receipt on first and second nuts 81 and 82 as shown. By proper adjustment of the nuts 81 and 82, the scoring means or sharp point of the scriber 65 may be aligned and adjusted vertically as shown in FIG. 9 into proper scoring position.

A threaded stop screw 83 extends through the cross bar portion of yoke 62 immediately adjacent the side wall 69 for selectively contacting the rotor 63 to prevent it against rotation. This is advisable when transporting the device, for example.

The other upstanding arm 84 of the yoke 62 extends above the cross arm parallel to the arm 69, and also slightly below the cross arm of the yoke thereby forming an inside corner which is mounted within a complementary shaped portion of the handle 61. A generally L-shaped transfer block 85 is constructed to fit onto the upstanding arm 84 of the yoke 62. More particularly, the transfer block has one arm 86 with an internal face 87 of dimensions and geometry identical to the outer wall of 84. Three transverse openings are formed in 86 accommodating two guide pins 88 with large external heads and a third pin 89 limiting the travel of block 85. A set screw 90 (FIG. 8) enables maintaining the position of the central pin 89 and thus the travel of block 85. There are three openings in yoke arm 84 which align, respectively, with the openings in 86 for receiving the ends of pins 88 and 89. The pins 88 include compression springs 91 about the uppermost and the lowermost pin as shown in FIG. 9 which serve to guide the transfer block 85 in a resilient spaced relationship to the outer surface of yoke arm 84. More particularly, the pin openings located in the arm 84 include slide bushings 92 against which one end of the springs can exert their force while the other ends of the springs are each located within a well 93 in the surface 87.

The upwardly directed support surface 66 of the transfer block horizontal arm is substantially flat and coplanar with the opening 76 in shaft 71. In addition, at its uppermost end portion the flat surface includes a V-shaped notch guide means 94 that is collinear with the opening 76 for a purpose to be shown.

Preferably, the pins 88 and 89 are slidingly received within the openings in yoke arm 84 and tightly received in the transfer block openings. In this manner, the transfer block is movable solely along a path toward and away from the yoke arm 84. The large head of the pin 89 serves as a limit stop in a way that will be described.

The clamping means 67 consists generally of an L-shaped member, one arm 95 of which is adapted to extend over the support surface 66 of the transfer block, and the other arm 96 extends generally parallel to the outside surface of the block. A pair of plates 97 (FIG. 8) integral with arms 95, 96 partially enclose the sides of the L-shaped member and include a pivot pin 98 passing therethrough which is rotatably received within the upper portion of the block 85. A holding pad 99 is affixed to the inner end surface of arm 95 and is located immediately opposite the flat support area 66 of the transfer block (FIGS. 8 and 9). A compression spring 100 has one end received within a declivity in the inner surface of the L-shaped member arm 96 with the other spring end received in a similarly shaped declivity in the outside surface of the transfer block 85 (FIG. 9). In this way, the spring 100 acts to resiliently urge the fiber holding pad 99 in contact with the flat support surface 66. It is also to be noted that when the arm 96 of the L-shaped member 67 is depressed towards transfer member 85, the movement of the block 85 toward yoke arm 84 is limited by contact of surface 87 against the arm 84. On the other hand, the head of pin 89 serves as an outer limit stop for block 85 on moving away from arm 84.

In use of the second described embodiment, the fiber 64 having its protective buffer covering removed from an extensive end portion is inserted into the enlarged opening 75 of the shaft 71 until the bare fiber extends outwardly of the opening 76 a sufficient amount to bridge the intervening space between the shaft end and the outer end of support 66. It is preferable at this time that the stop screw 83 engage the outer surface of rotor 63 preventing it from moving. Also, substantially simultaneously, as the bare fiber extends over the support surface 66 and through the V-block guide, the operator presses on the arm 96 of the L-shaped actuator with his thumb, for example, until it is moved to the dashed line position shown in FIG. 9, thereby permitting the bare fiber to pass under the raised fiber holding pad. Also, as the operator presses on the arm 96 to raise the holding pad, this will move the transfer block 85 toward the yoke arm 84 placing the springs 91 under compression. On release of the L-shaped actuator 67, the coil spring 100 causes the fiber holding pad to engage the bare fiber and hold it against the flat surface of the support surface 66. Simultaneously with the fiber being clamped by the holding pad 99, release of the hand hold causes the springs 91 to place the bare fiber between the rotor and surface 66 in tension.

Figure 10:
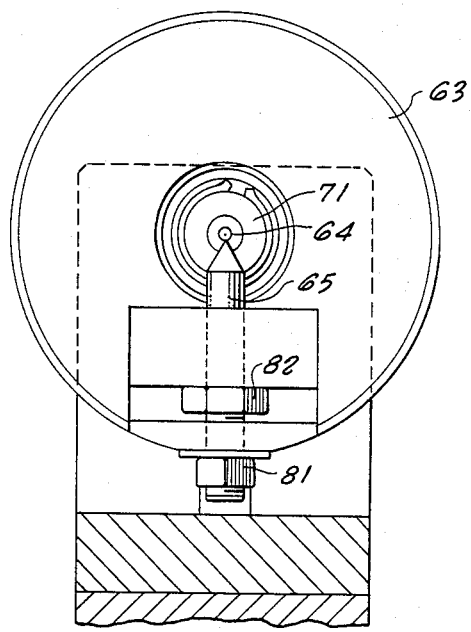
FIG. 10 is an end sectional view taken along the line 10—10 of FIG. 9.
Figure 11:
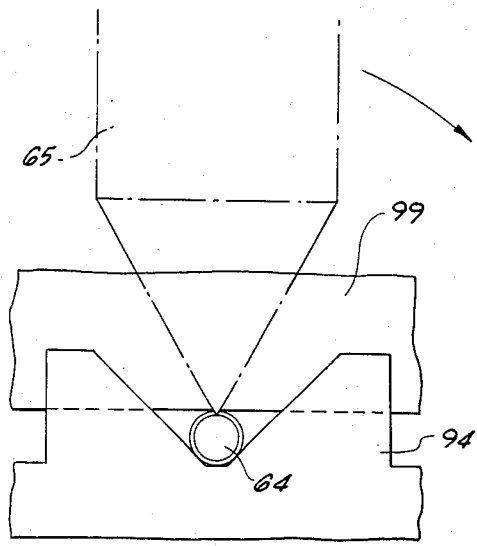
FIG. 11 is an enlarged, end elevational, partially schematic view of a fiber being cleaved by the apparatus of FIG. 8.
Figure 12:
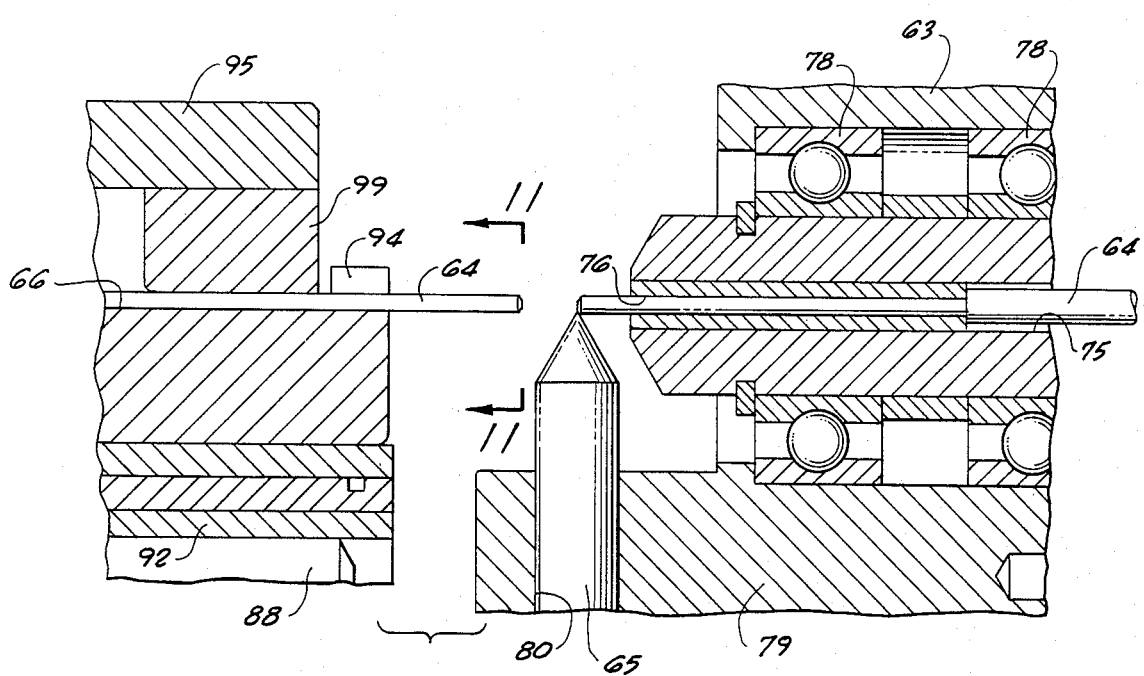
FIG. 12 is a side elevational view showing a fiber immediately after cleaving.

Next, the stop screw 83 is released and the rotor 63 rotated through a full 360 degrees to produce a score line on the fiber as shown in FIGS. 10 and 11. As soon as the score line is produced on the fiber and as a result of the tension placed in the fiber by springs 91, cleavage along the score line is produced along a face that is precisely at 90 degrees to the fiber long dimension. Also, as in the first described apparatus, the cleavage is produced without torsion or twisting of the fiber.

Adjustment of nuts 81 and 82 not only locate the scoring point of the rod 80 vertically, but also permits rotating the tool to eliminate any inaccuracy due to concentricity misalignment. In both described embodiments, it is contemplated that the actual point of the scriber be constructed of a diamond tip which has been added to the relatively pointed end of rods 32 and 65, as the case may be.

We claim:

1. Apparatus for cleaving an optical fiber comprising:
   shaft means having an axially extending opening therethrough for receiving a fiber therein;
   a transfer block having a fiber support surface thereon;
   first spring means resiliently urging the transfer block away from the shaft means;
   lever means pivotally mounted to said transfer block for selectively moving a fiber holding pad toward and away from the transfer block support surface while simultaneously moving the transfer block respectively away from and toward the shaft means such that release of the lever means moves the pad against the fiber and at the same time places the fiber in tension;
   second spring means interconnecting the lever means and the transfer block resiliently urging the fiber holding pad toward the support surface; and
   sharp-pointed means rotatably mounted on said shaft means for contacting the circumferential periphery of the fiber and effecting a single score line completely around the fiber that is precisely 90 degrees to the fiber longitudinal axis.

2. Apparatus as in claim 1, in which the shaft means is mounted onto a yoke arm, the transfer means is slidingly interconnected with the yoke arm by a plurality of pins, and the first spring means resiliently interrelating the yoke arm and transfer block.

3. Apparatus as in claim 1, in which the shaft means opening has an entrance end portion of which opening has a cross-sectional dimension larger than that of a fiber with protective cover and an exit end portion of which opening is smaller than said entrance end portion cross-section.

4. Apparatus as in claim 1, in which the sharp-pointed means is carried by a rotor rotatably journaled about the shaft means axially extending opening.

5. Apparatus as in claim 1, in which the shaft means, transfer block, first spring means, lever means, second spring means and sharp-pointed means are all assembled on the end of a handle such that the lever means is hand operable.

* * * * *